(12) United States Patent
Wu et al.

(10) Patent No.: US 12,196,724 B2
(45) Date of Patent: Jan. 14, 2025

(54) HARDNESS TESTER

(71) Applicants: Shaoming Wu, Thousand Oaks, CA (US); Richard Wu, Thousand Oaks, CA (US)

(72) Inventors: Shaoming Wu, Thousand Oaks, CA (US); Richard Wu, Thousand Oaks, CA (US)

( * ) Notice: Subject to any disclaimer, the term of this patent is extended or adjusted under 35 U.S.C. 154(b) by 268 days.

(21) Appl. No.: 18/052,877

(22) Filed: Nov. 4, 2022

(65) Prior Publication Data

US 2024/0151618 A1 May 9, 2024

(51) Int. Cl.
*G01N 3/42* (2006.01)
*G01B 11/24* (2006.01)

(52) U.S. Cl.
CPC .............. *G01N 3/42* (2013.01); *G01B 11/24* (2013.01); *G01N 2203/0078* (2013.01)

(58) Field of Classification Search
CPC ..... G01N 3/40; G01N 3/42; G01N 2203/0078
See application file for complete search history.

(56) References Cited

U.S. PATENT DOCUMENTS

| | | | |
|---|---|---|---|
| 9,366,610 B2 * | 6/2016 | Zhang ...................... | G01N 3/42 |
| 9,581,533 B2 * | 2/2017 | Wu ........................... | G01N 3/42 |
| 10,663,385 B2 * | 5/2020 | Miyajima ................ | G01N 3/54 |
| 10,969,318 B2 * | 4/2021 | Sadahiro .................. | G01N 3/42 |

* cited by examiner

*Primary Examiner* — Erika J. Villaluna
(74) *Attorney, Agent, or Firm* — Clement Cheng

(57) ABSTRACT

An indentation type hardness tester applies a predetermined force to an indenter and the indenter produces an indentation on a test specimen, and then measures the shape and size of the indentation. The hardness tester has a tester body and different frames. The tester body has a cavity and a magnetic base. The user selects different frames based on measurement needs and installs the frame into the magnetic base of the tester body. The testing head is equipped with an optical imaging system, the front end of the testing head is equipped with a removable load cell, and the front end of the load cell is equipped with an indenter. The indenter, load cell and optical system are coaxially oriented. A motor moves the tester body to perform the indentation.

20 Claims, 5 Drawing Sheets

HARDNESS TESTER

FIELD OF INVENTION

The present invention is in the field of hardness testers. The present invention relates to a material hardness measuring device, and more specifically to a penetration hardness tester, which allows the user to measure, to high precision, the hardness of materials using many types of hardness tests.

DISCUSSION OF RELATED ART

The indentation type hardness tester is a well-known hardness measuring instrument. This hardness test applies a predetermined force to an indenter, which then makes an indentation on the test specimen, and then measures either the depth of the indentation, such as for a Rockwell hardness test or for a Brinell hardness test, or the dimensions of the indentation, such as for a Vickers hardness test. The Vickers hardness tester produces very small indentations, which are very difficult to observe with the naked eye, so it is usually used for testing very smooth and very precise samples. Because the indentation is so small, its dimensions can only be measured with a microscope. However, it is difficult to align the microscope to the indentation after removing the indenter because they are not placed together. Usually, this type of hardness tester has a base with a turret above it. The turret is equipped with the indenter and the objective lens of the microscope. After the indenter makes an indentation on the sample, the turret is then rotated to align the objective lens of the microscope with the indentation, but the objective lens will not be perfectly aligned to the indentation due to limitations of the design. Because the indentation is too small, it is difficult for the objective lens to acquire the indentation in its view. Therefore, there is an XY worktable under the base, that is, under the objective lens, on which the sample is placed. By adjusting the two axes of X and Y, the sample can be moved to allow the indentation to be seen with the objective lens.

The turret is described in United States patent D704582. A variety of different turret-based hardness testers are described in U.S. Pat. Nos. 9,207,156 and 10,094,753 which still use this structure. The turret and worktable necessitate the hardness testers to be bulky, large, complicated to operate and use a space consuming vertical measuring structure, which limits its use to a laboratory setting, and is not suitable for use in certain environments. The large hardness testers also cannot test large samples or complex shapes.

SUMMARY OF THE INVENTION

An object of the invention is to provide a hardness tester that is portable and can operate as a cell phone accessory or standalone. This new hardness testing machine can be used in a factory environment or any other environment such as in an outdoors setting. The present invention can measure the hardness of various shapes and sizes, which increases testing efficiency, reduces testing costs and allows testing in any position and direction.

Another object of the present invention is to provide a hardness tester that is easy to operate, highly accurate and capable of automatic measurements.

Another object of the present invention is to provide a hardness tester with a simpler structure, which lowers costs and requires less maintenance.

To achieve the above objects, the present invention proposes an indentation hardness tester with a novel structure, which includes a tester body and a set of different frames. The tester body has a cavity and a magnetic base. Users can choose different frames based on their measurement applications and install the frame in the magnetic base of the tester body. There is a testing head inside the cavity of the tester body, and the testing head is equipped with an optical system. The testing head consists of a removable load cell and an indenter. The load cell is mounted on the front end of the testing head, and the indenter is mounted on the front end of the load cell. The indenter, load cell, and optical system are all coaxial. A motor connected to a reduction drive is installed at the other end of the cavity of the tester body. The reduction drive reduces the speed of the motor and drives a screw to move the measuring head. With the aforementioned structure, the user can select the appropriate frame based on the test specimen, and assemble it to the tester body to form a specialized hardness testing instrument, which can test the hardness of complex shaped test specimens, expanding the application range of the combined hardness testing instrument, all of which better meet the demands of the user.

The tester of the present invention has a movable testing head installed in the cavity of the tester body, and an optical system installed in the testing head. The front end of the testing head has a load cell, and the front end of the load cell has a detachable indenter coaxial with the optical system. When the indentation is complete, the user can remove the indenter. Because the optical system is coaxial with the indenter, the objective lens of the optical system is directly aimed at the test sample and can directly measure the indentation formed by the indenter.

The tester of the present invention has a movable testing head installed in the cavity of the tester body, an optical system installed in the testing head, a removable load cell installed at the front end of the testing head, and an indenter installed at the front end of the load cell. The indenter, load cell and optical system are all coaxial with each other. The load cell can directly sense the force on the indenter without interference signals from other transmission mechanisms. When the motor drives the testing head into motion pressing the indenter into the test specimen, the load cell senses the force on the indenter and feeds it back to the control system, which commands the motor to continuously apply force on the indenter until the force reaches a predetermined value set by the user.

The tester of the present invention has a movable testing head installed in the cavity of the tester body, an optical system installed in the testing head, a removable load cell installed at the front end of the testing head, and an indenter installed at the front end of the load cell. The indenter, load cell and optical system are all coaxial with each other. The front end of the testing head has a permanently installed fixed objective lens cover. The front end of the objective lens cover is a circular flange, which is coaxial with the testing head, and the flange rim carries evenly distributed magnets. The back of the load cell has a circular groove, which aligns with and sticks to the magnets on the circular flange at the front end of the objective lens cover, ensuring the load cell and the indenter installed on it are coaxial with the testing head.

The tester of the present invention has a movable testing head installed in the cavity of the tester body, an optical system installed in the testing head, a removable load cell installed at the front end of the testing head, and an indenter installed at the front end of the load cell. The indenter, load cell and optical system are all coaxial with each other. The optical system inside the testing head consists of an objective lens, filter, and image sensor. The objective lens of the optical system accurately magnifies the image of the indentation, the filter removes extraneous light interference, and the image sensor converts the image of the indentation into a digital signal and sends it to a computer. The computer then measures the dimensions of the indentation and use the dimensions to calculate the hardness value of the sample.

The tester of the present invention has a movable testing head installed in the cavity of the tester body, an optical system installed in the testing head, a removable load cell installed at the front end of the testing head, and an indenter installed at the front end of the load cell. The indenter, load cell and optical system are all coaxial with each other. The optical system inside the testing head consists of an objective lens, filter, and image sensor. The front end of the objective lens of the optical system is equipped with a light source, which illuminates the test specimen, in particular the indentation on the test specimen.

The tester of the present invention consists of a cavity of the tester body and a magnetic base of the tester body that are parallel to each other, and the magnetic base of the tester body is used to install different frames. The bottom of the tester body is a flat base, which is perpendicular to the magnetic base of the tester body. The flat base at the bottom of the tester body is used for positioning the test specimen. The test specimen can be attached to the hardness tester for measurement on a flat base equipped with evenly distributed magnets or can be held with a frame clamp.

The tester of the present invention consists of a motor, a reduction drive connected to the motor, and a screw driven by the reduction drive that are fixed in the cavity, and a nut installed at the rear of the testing head that converts the rotary motion of the screw into a linear motion of the testing head.

The tester of the present invention consists of a reduction drive which is specifically a planetary reduction drive and a motor connected to the reduction drive. The reduction drive slows down and drives the screw.

The tester of the present invention consists of a battery powered electronic system arranged in the tester body. The battery power allows the tester of the present invention to be easier to carry and use for the user.

The tester of the present invention consists of a tester body that contains an electronic system which includes a control circuit, a motion control and drive system, a data display system, and a digital communication system. The motion control and drive system is a closed-loop digital automatic control system, which commands the testing head to move forwards and backwards, to press the indenter into the test specimen based on the force detected by the load cell until a predetermined force has been reached, as well as command the testing head to move to allow the optical system to focus on the test specimen, in order to produce a clear image of the indentation on the test specimen. The display system displays the test results, and the communications system sends the data to the computer through a cable or wirelessly.

The tester of the present invention consists of an L-shaped frame with a positioning key, which is inserted into the magnetic base of the tester body and fixed together by screws. The L-shaped frame has a screw hole coaxial with the tester body, and a screw is installed in the screw hole. There is an anvil at the front end of the screw. By rotating the screw, the test specimen is fixed to the hardness tester.

The screw drive formed with the screw hole and the screw can have a linear motor controller for linear screw drive control.

In accordance with another aspect of the invention, the present invention provides a type of indentation tester to test the hardness of a test specimen including the following steps and features:

(a) The user can use only the magnetic base or attach a frame. The user can directly place the test specimen on the magnetic base. Alternatively, the user can optionally use a suitable frame to hold the test specimen.

(b) Start the hardness tester and set the value of force needed for the test.

(c) The control and drive system drives the motor and the screw, the testing head moves towards the test specimen, and the indenter presses into the test specimen and produces an indentation.

(d) The testing head automatically returns to its original position, the removable load cell and the indenter are removed, and the objective lens of the optical system is aligned with the indentation on the test specimen.

(e) The testing head moves to the test specimen, so the objective lens of the optical system in the testing head automatically focuses on the indentation on the test specimen.

The image sensor sends the signal of the indentation image to the computer. Then the computer displays a clear image of the indentation, and measures the indentation's dimensions, and then uses the dimensions to calculate the hardness of the test specimen.

A hardness tester has a tester body, a motor mounted to the tester body, a testing head, a load cell, and an image sensor. The motor is configured to bias the testing head toward a specimen. The load cell is removably attached to the testing head. The testing head has two modes including a first mode which is an indentation mode when the load cell is attached to the testing head, and a second mode which is an optical imaging mode when the load cell is removed from the testing head. An indenter is mounted to the load cell. The indenter is pressed against the specimen when the motor biases the testing head toward the specimen. A lens is mounted to the testing head. The load cell covers the lens when the load cell is mounted to the testing head. The lens is coaxially aligned to the indenter. An image sensor is optically connected to the lens. The image sensor provides a material hardness data output. The load cell is formed with a load cell sidewall. The load cell sidewall is connected to a load cell base. The load cell sidewall has a load cell sidewall thickness. The load cell base has a load cell base thickness that is less than or equal to half as thick as the load cell sidewall thickness.

A load cell abutment face is formed on the load cell sidewall. A sensor indent is formed on an interior surface of the load cell, and the load cell sensor is mounted to the sensor indent. The load cell sensor can be a stress or strain gauge. An indenter retainer barrel protrusion protrudes into a circular groove of the load cell. A load cell base indent is formed on an exterior surface of the load cell base. A sensor cable connects the load cell sensor to an electronic controller housed in the tester body. A wireless signal can connect the electronic controller to a mobile device such as by a Bluetooth signal. The mobile device may include a mobile device application for sharing hardness data.

The following call out list of elements can be a useful guide in referencing the element numbers of the drawings.
- 10 Testing Head
- 11 Stress Strain Sensor
- 12 Load Cell Sensor
- 13 Sensor Cable
- 14 Sensor Indent
- 15 Load Cell Sidewall
- 16 Indenter Retainer
- 17 Load Cell Base
- 18 Load Cell Base Indent
- 19 Indenter Retainer Barrel Protrusion
- 101 Load Cell
- 102 Indenter
- 103 Light Source
- 104 Objective Lens Cover
- 105 Objective Lens
- 106 Objective Lens Holder
- 107 Filter
- 108 Image Sensor And Magnification Circuit
- 109 Nut
- 110 Screw
- 1011 Circular Groove
- 1041 Circular Flange
- 1042 Magnets
- 20 Tester Body
- 21 Sidewall Cut Out
- 22 Sidewall Cut Out Right Wall Edge
- 23 Sidewall Cut Out Left Wall Edge
- 24 Sidewall Cut Out Lower Wall Edge
- 25 Load Cell Sidewall Lower Bevel
- 26 Indenter Retainer Sidewall
- 27 Indenter Retainer Opening
- 28 Indenter Retainer Base
- 29 Base Indent Step
- 200 Cavity
- 201 Reduction Drive
- 202 Motor
- 203 Box
- 204 Magnetic Base
- 30 Frame
- 31 Load Cell Sidewall Thickness
- 32 Load Cell Base Thickness
- 33 Load Cell Abutment Face
- 34 Testing Head Sidewall
- 301 L-Shaped Frame
- 302 Fastening Screw
- 303 Anvil
- 401 Small Test Specimen
- 402 Large Test Specimen
- 51 Battery
- 52 Controller
- 53 Data Bridge
- 54 Database
- 55 Wireless Connection
- 56 Input Output Connectors
- 57 Control Button
- 58 Wireless Signal
- 59 Mobile Device
- 60 Application
- 61 Friends List
- 62 Social Media Feed
- 88 Focal Point of Lens
- 89 Engaging Tip of Indenter

DETAILED DESCRIPTION OF THE PREFERRED EMBODIMENT

Figure 1:
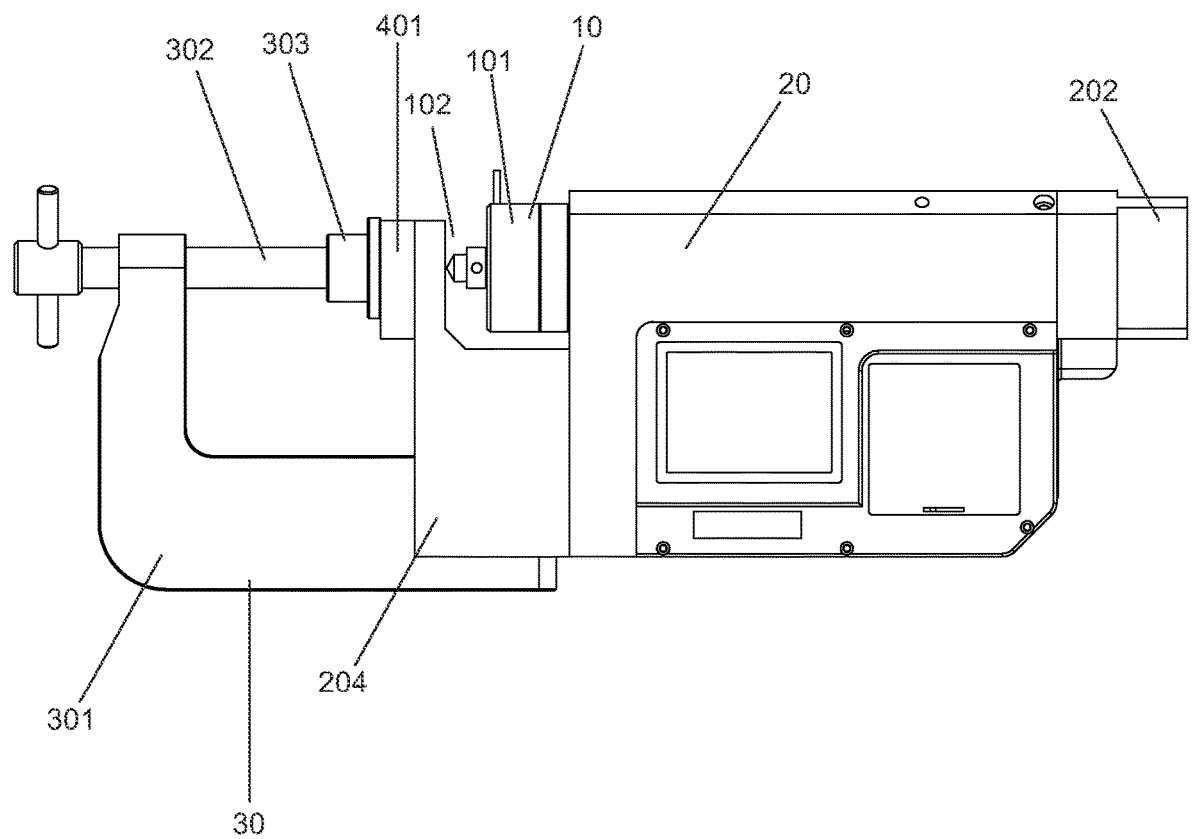
FIG. 1 is a schematic diagram of the assembly of the hardness tester and an L-shaped frame.

Specific embodiments of the indentation hardness tester according to the present invention will be described in detail below with reference to FIGS. 1-5. As shown in FIG. 1 and FIG. 3, the tester body 20 includes a cavity 200 and a magnetic base 204, which are parallel to each other. Among them, the magnetic base 204 is used to install different frames selected by the user based on the test specimen. The cavity 200 of the tester body 20 is equipped with the testing head 10, the reduction drive 201, and the motor 202. One end of the reduction drive 201 is coupled with the motor 202, the other end of the reduction drive 201 is coupled with the screw 110, and the motor 202 is fixed to the tester body with screws, and coaxial with the cavity 200 of the tester body 20, the motor 202 drives the reduction drive 201, which reduces speed and drives the screw 110, and the nut 109 at the rear end of the testing head 10 converts the rotational motion of the driven screw 110 into linear motion, which moves the testing head 10 at the front end of the cavity 200. The reduction drive 201 is a planetary reduction drive. The tester body 20 also includes a box 203, which is equipped with a motion control and driving system circuit, a data processing system circuit, and a data display system circuit.

Figure 3:
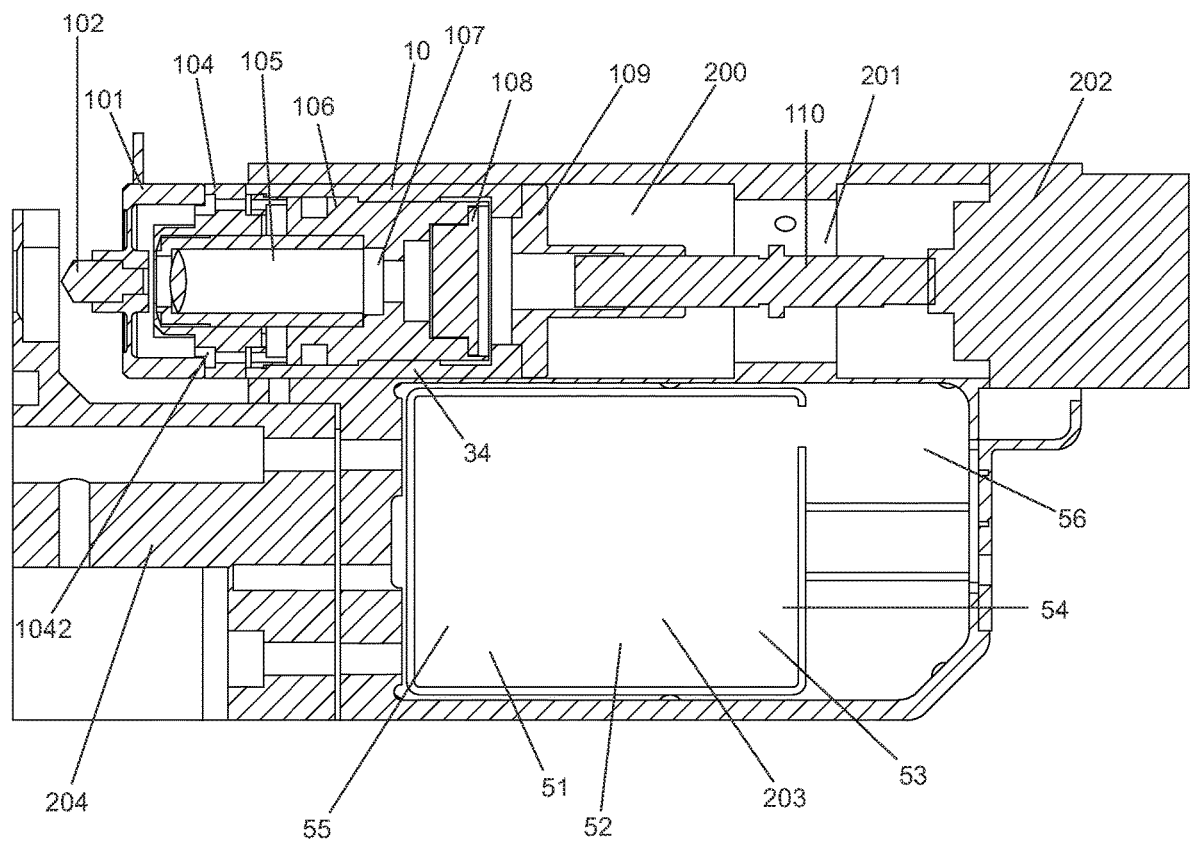
FIG. 3 is a cross-sectional view of the hardness tester body equipped with a load cell and an indenter, which is the first mode of operation.
Figure 4:
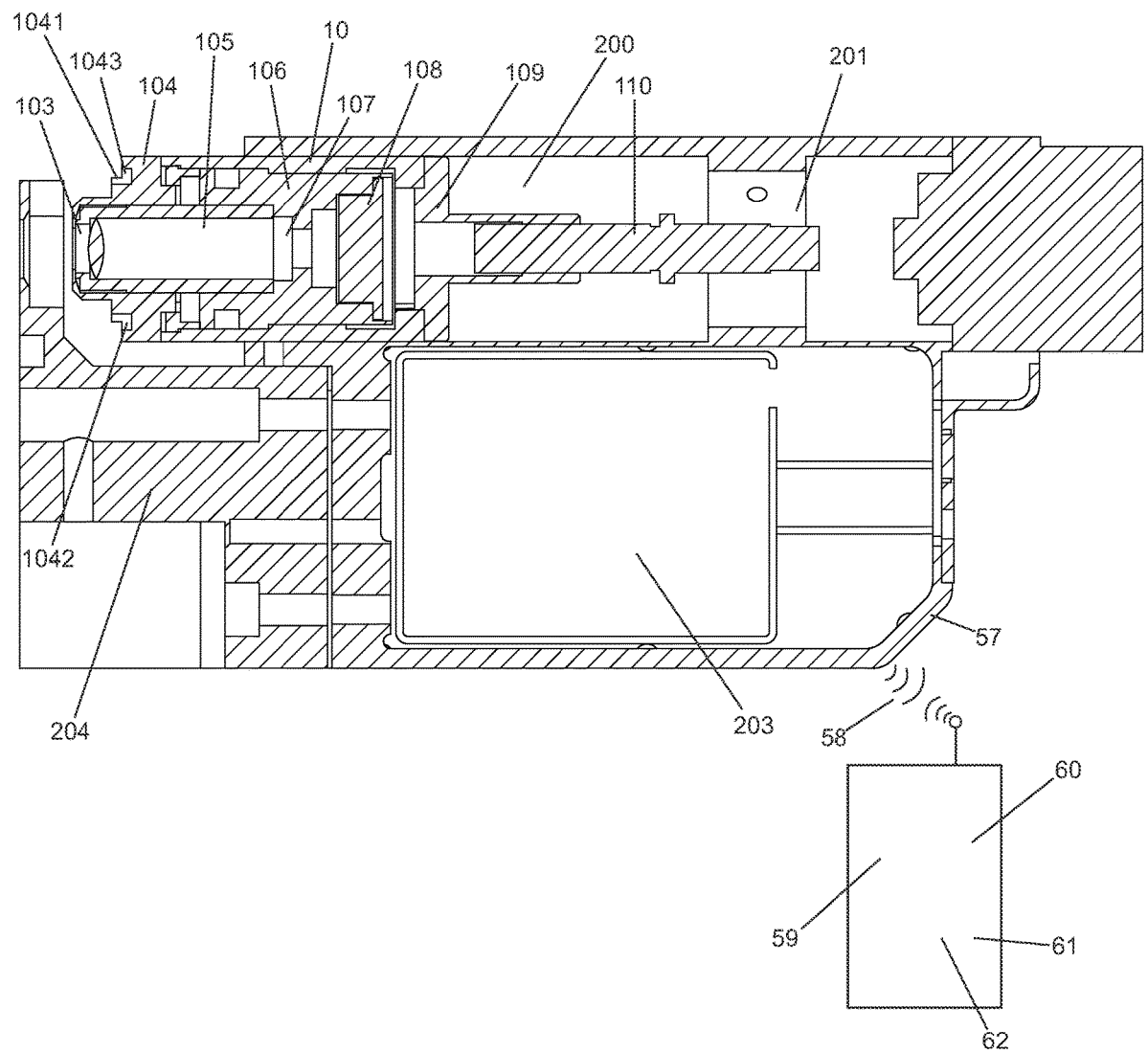
FIG. 4 is a cross-sectional view of the hardness tester body with the load cell and the indenter removed and exposing the optical system, which is the second mode of operation.
Figure 5:
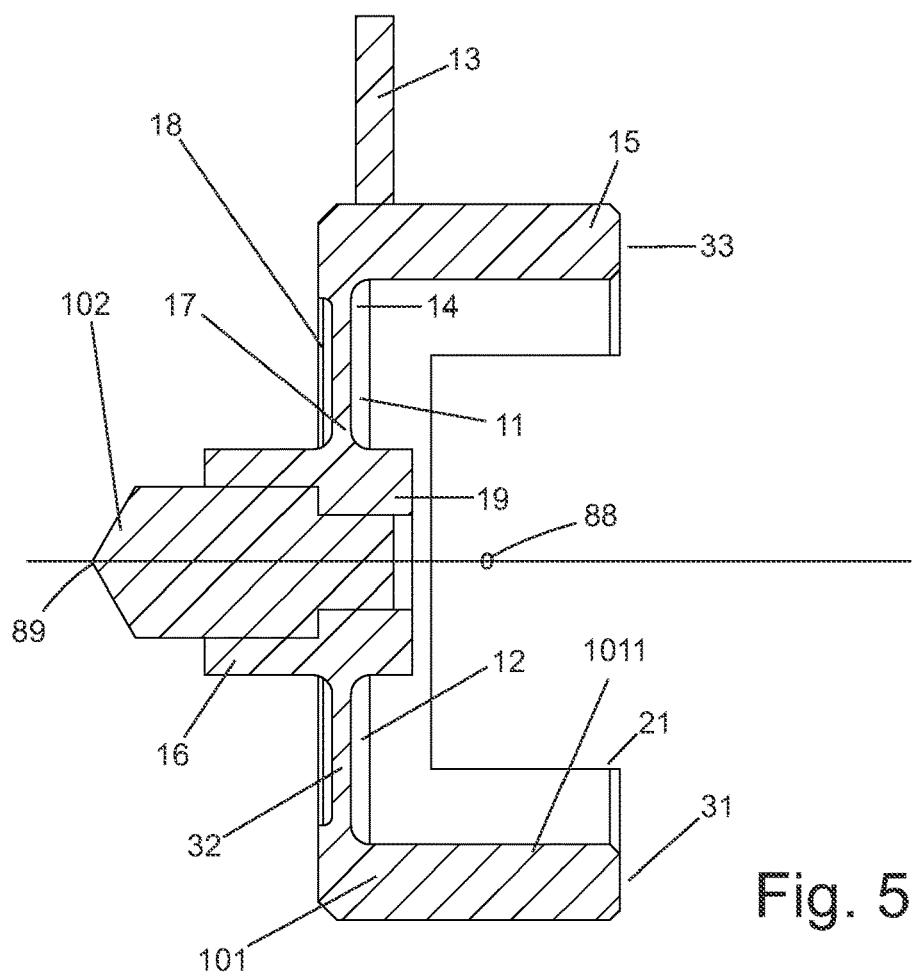
FIG. 5 is a cross-sectional view of the load cell and indenter.

As shown in FIGS. 3-5, the front end of the testing head 10 is equipped with an objective lens cover 104. The objective lens cover 104 has a circular flange 1041, the circular flange 1041 is coaxial with the testing head 10. The rear of the load cell 101 of the testing head has a circular groove 1011, the front end of the load cell 101 is equipped with an indenter 102, the indenter 102 is coaxial with the circular groove 1011 on the rear of the load cell 101, the objective lens cover 104 of the testing head 10 is equipped with evenly distributed magnets 1042, the magnets 1042 of the objective lens cover 104 can stick the load cell 101 onto the objective lens cover 104. The circular flange 1041 on the objective lens cover 104 is combined with the circular groove 1011 of the load cell 101. The indenter 102 is coaxial with testing head 10. When the testing head 10 is driven by the motor 202, it can move towards the test specimen 401. When the indenter 102 touches the test specimen 401, the load cell 101 senses that the indenter 102 is applying force onto the test specimen 401 in real time. The value of the currently applied force is fed back to the motor control system, and the output torque of the motor 202 is adjusted in real time to ensure that the indenter produces an indentation on the test specimen 401 at the predetermined force value set by the user.

As shown in FIG. 4, an objective lens holder 106 is installed inside the testing head 10, the objective lens holder 106 is coaxial with the testing head 10. An objective lens 105 is installed on the objective lens holder 106, and the objective lens 105 is coaxial with the objective lens holder 106. A filter 107 and image sensor and magnification circuit 108 are installed on the objective lens holder 106, the image sensor and magnification circuit 108 is coaxial with the objective lens holder 106, to ensure that the image of the indentation passing through the objective lens 105 can be directly reflected on the image sensor and magnification circuit 108. The front end of the objective lens 105 has a light source. A light source 103 is provided at the front end of the objective lens 105. The light source can be an LED.

After the indenter 102 produces an indentation on the test specimen 401, the motor 202 automatically reverses, and the testing head 10 returns to the initial position. When the load cell 101 is removed, a switch is automatically triggered. A photosensitive switch 1043 is installed on the objective lens cover 104. The motor 202 rotates forward automatically, the testing head 10 moves toward the test specimen 401, and the light source 103 illuminates the test specimen 401. When the testing head 10 approaches the test specimen 401, the motor 202 rotates slower, so the testing head 10 moves slower, so the optical system focuses on the specimen, and a clear image of the indentation is captured by the image sensor and magnification circuit 108, and the indentation image is converted into a digital signal and sent to the computer. The computer measures and analyzes this image, performs calculations, and obtains the hardness value of the test specimen 401 such as by comparing the measurements to a database.

Figure 2:
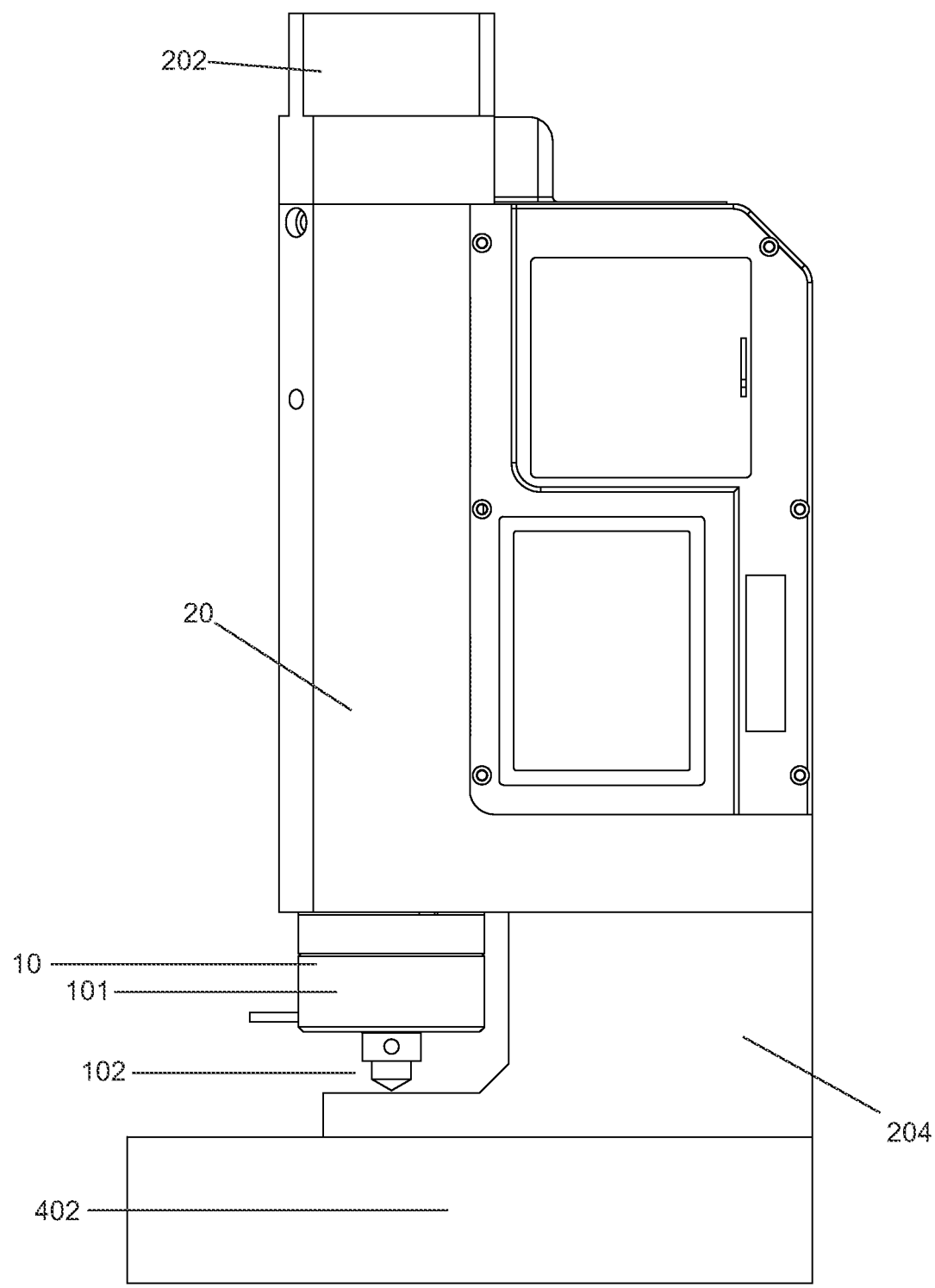
FIG. 2 is a schematic diagram of the magnetic base of the hardness tester sticking on a large, tested sample.

As shown in FIG. 2, the tester can hold onto a large test specimen 402 by directly sticking the large test specimen 402 onto the magnetic base 204 of the tester body. As seen in FIG. 1, the operation of the portable hardness tester can be handheld and can be hand carried. The optional frame 30 can connect to the magnetic base 204 of the tester body. The frame 30 can have an extended L-shaped frame 301 with a fastening screw 302. The fastening screw 302 can be hand tightened and the anvil 303 can hold the test specimen 401. The indenter 102 automatically presses into the small test specimen 401 as it is driven by a motor 202 mounted to the tester body 20. The motor 202 drives the testing head which includes the load cell 101 with the indenter 102 into the small test specimen 401. The internal operation as seen in FIG. 3 is not visible to the user and happens automatically. The motor 202 rotates a screw 110. The screw 110 is formed as a screw drive shaft that passes through a cavity 200. The nut 109 is threaded and engaged to the screw 110 so that it pushes the testing head 10 in an outward direction away from the screw and the motor. The nut 109 receives force at a middle portion where a nut barrel extension forms a tube that engages to the screw. The tube has an internally fine thread engaging with the screw 110. The middle portion of the nut transmits the force to the testing head 10 along the testing head sidewall 34. The testing head sidewall 34 engages the nut 109 at a step on the nut 109. The testing head sidewall slides along the side wall of the cavity 200. The cavity 200 is formed in the tester body 20. The testing head sidewall 34 also encloses an objective lens holder 106 which in turn retains an objective lens 105. The objective lens 105 passes light from the objective lens through a filter 107 to the image sensor and magnification circuit 108. The testing head sidewall 34 then transmits force to the load cell 101.

The force transmitted to the load cell is measured by an electronic controller 52. The controller 52 is powered by a battery 51 and can be mounted in a box 203. The controller can be part of a computer that has a database 54 and a data bridge 53 allowing input output connectors 56 such as USB or other cable connection. Alternatively, a wireless connection 55 can provide Bluetooth or another type of wireless data transfer.

As seen in FIG. 4, the box 203 can be electronically connected to a control button 57. A wireless signal 58 can communicate between a mobile device 59 such as a cell phone and the electronic controller 52. The mobile device 59 preferably includes an application 60 which could have a friends list for sharing data. The friends list can be organized and implemented online as a social media feed 62 for example. The data in the controller can be captured when the photosensitive switch 1043 senses removal of the load cell 101. The photosensitive switch 1043 can be mounted near a circular flange 1041 which can also have magnets 1042 that retain the load cell 101 to the circular flange 1041.

As seen in FIG. 5, the load cell 101 has a load cell sidewall 15 with a load cell sidewall thickness 31 having sufficient thickness to form a load cell abutment face 33. The load cell abutment face 33 receives compressive force from the testing head sidewall 34 which in turn receives compressive force from the nut 109 which in turn receives compressive force from the screw 110. The load cell sidewall 15 connects to the load cell base 17. The load cell base 17 is formed at a right angle to the load cell sidewall 15. The load cell base 17 is connected to the indenter retainer 16. The indenter retainer 16 retains the indenter 102. The indenter retainer 16 extends past the load cell base 17 as an indenter retainer barrel protrusion 19 that extends into a hollow portion of the load cell 101. The load cell base 17 has a load cell base thickness 32 that is less than half of a thickness of the load cell sidewall thickness 31. The indenter 102 has a stepped shoulder which engages a stepped shoulder socket of the indenter retainer 16. The circular groove 1011 of the load cell 101 extends downwardly into a sensory indent 14 where a stress or strain gauge 11, or another load cell sensor 12 can sense force or displacement or both. The sensor is connected to the sensor cable 13 and the sensor cable 13 is connected to the box 203 so as to provide sensor data to the controller 52 in the box 203.

The testing head thus has two modes, the first mode is when the load cell abutment face 33 is magnetically attached to the circular flange 1041 by the magnets 1042 as seen in FIG. 3. The first mode is the indentation mode. The second mode is when the load cell is removed from the testing head 10, as seen in FIG. 4. The second mode is the optical imaging mode. A user manually removes and reattaches the load cell 101 to switch between the two modes. The sidewall cut out 21 formed on the load cell sidewall 15 allows the load cell 101 to slip around the objective lens cover 104, which may protrude into a cavity of the load cell 101. The objective lens cover 104 may have a protruding extension that protrudes into the cavity of the load cell 101. The protruding extension preferably is sized to the cutout. A focal point of the lens 88 is coaxially aligned to an engaging tip 89 of the indenter. The engaging tip 89 of the indenter is the tip that touches the sample. The focal point of the lens 88 is centered to in line with the engaging tip 89.

Figure 6:
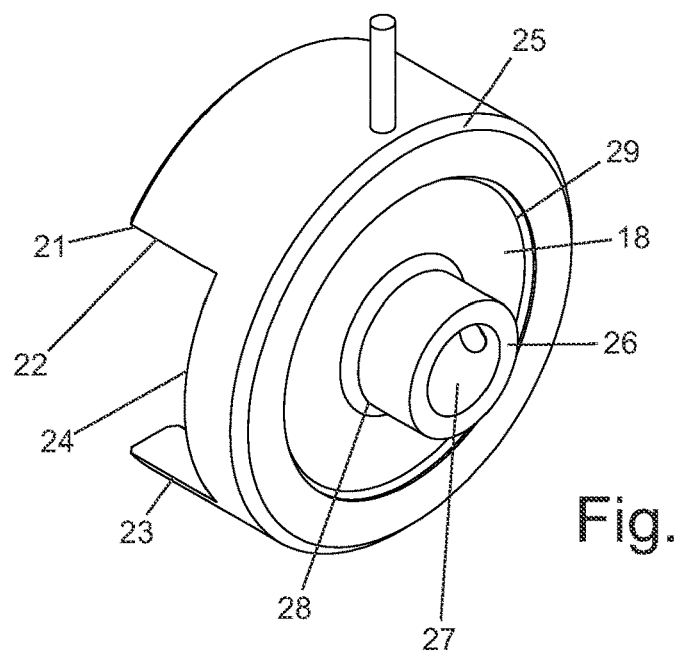
FIG. 6 is a perspective view of the load cell and indenter.

As seen in FIG. 6, the sidewall cut out 21 has a sidewall cut out right wall edge 22, a sidewall cut out left wall edge 23 and a sidewall cut out lower wall edge 24. The load cell 101 also has a load cell sidewall lower bevel 25 on the other side of the load cell abutment face 33. The base indent step 29 circumscribes the load cell base indent 18 and the load cell base indent extends inwardly to an indenter retainer sidewall 26 at an indenter retainer base 28. The indenter retainer sidewall 26 has an indenter retainer opening 27.

One skilled in the art will understand that the embodiment of the present invention as shown in the drawings and described above is exemplary only and not intended to be limiting. It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

The invention claimed is:

1. A hardness tester comprising:
   a. a tester body;
   b. a motor mounted to the tester body;
   c. a testing head, wherein the motor is configured to bias the testing head toward a specimen;
   d. a load cell, wherein the load cell is removably attached to the testing head, wherein the testing head has two modes including a first mode which is an indentation mode when the load cell is attached to the testing head, and a second mode which is an optical imaging mode when the load cell is removed from the testing head;
   e. an indenter mounted to the load cell, wherein the indenter is pressed against the specimen when the motor biases the testing head toward the specimen;
   f. a lens mounted to the testing head, wherein the load cell covers the lens when the load cell is mounted to the testing head, wherein the lens is coaxially aligned to the indenter; and
   g. an image sensor optically connected to the lens, wherein the image sensor provides a material hardness data output.

2. The hardness tester of claim 1, wherein the load cell is formed with a load cell sidewall, wherein the load cell sidewall is connected to a load cell base.

3. The hardness tester of claim 2, wherein the load cell sidewall has a load cell sidewall thickness, wherein the load cell base has a load cell base thickness that is less than or equal to half as thick as the load cell sidewall thickness.

4. The hardness tester of claim 2, further including a load cell abutment face formed on the load cell sidewall.

5. The hardness tester of claim 2, further including a sensor indent formed on an interior surface of the load cell, wherein a load cell is mounted to the sensor indent.

6. The hardness tester of claim 5, wherein the load cell sensor is a stress or strain sensor.

7. The hardness tester of claim 5, further including an indenter retainer barrel protrusion that protrudes into a circular groove of the load cell.

8. The hardness tester of claim 5, further including a load cell base indent formed on an exterior surface of the load cell base.

9. The hardness tester of claim 1, further including a sensor cable, wherein the sensor cable connects a load cell to an electronic controller housed in the tester body.

10. The hardness tester of claim 1, further including a wireless signal connecting the electronic controller to a mobile device.

11. The hardness tester of claim 1, wherein a wireless signal is a Bluetooth signal.

12. The hardness tester of claim 1, wherein a mobile device has a mobile device application for sharing hardness data.

13. The hardness tester of claim 1, wherein the load cell is formed with a load cell sidewall, wherein the load cell sidewall is connected to a load cell base, wherein the load cell sidewall has a load cell sidewall thickness, wherein the load cell base has a load cell base thickness that is less than or equal to half as thick as the load cell sidewall thickness, further including a load cell abutment face formed on the load cell sidewall, further including a sensor indent formed on an interior surface of the load cell, wherein a load cell is mounted to the sensor indent.

14. The hardness tester of claim 13, wherein a load cell is a stress or strain sensor.

15. The hardness tester of claim 13, further including an indenter retainer barrel protrusion that protrudes into a circular groove of the load cell.

16. The hardness tester of claim 13, further including a load cell base indent formed on an exterior surface of the load cell base.

17. The hardness tester of claim 13, further including a sensor cable, wherein the sensor cable connects the load cell sensor to an electronic controller housed in the tester body.

18. The hardness tester of claim 13, further including a wireless signal connecting the electronic controller to a mobile device.

19. The hardness tester of claim 18, wherein the wireless signal is a Bluetooth signal.

20. The hardness tester of claim 1, wherein a focal point of the lens is coaxially aligned to the engaging tip of the indenter.

* * * * *